United States Patent [19]

Ikeda et al.

[11] Patent Number: 4,720,716

[45] Date of Patent: Jan. 19, 1988

[54] LIQUID JET RECORDING HEAD

[75] Inventors: Masami Ikeda, Machida; Makoto Shibata, Hiratsuka; Hiroto Takahashi, Hiratsuka; Hirokazu Komuro, Hiratsuka; Hiroto Matsuda, Ebina; Hisanori Tsuda, Atsugi, all of Japan

[73] Assignee: Canon Kabushiki Kaisha, Tokyo, Japan

[21] Appl. No.: 931,968

[22] Filed: Nov. 24, 1986

Related U.S. Application Data

[63] Continuation of Ser. No. 694,317, Jan. 24, 1985, abandoned.

[30] Foreign Application Priority Data

Jan. 31, 1984 [JP] Japan .................................. 59-14520

[51] Int. Cl.⁴ ......................... G01D 15/18; A05B 3/00

[52] U.S. Cl. .................................. 346/140 R; 219/216

[58] Field of Search ....................... 346/140 R; 219/216

[56] References Cited

U.S. PATENT DOCUMENTS 4,164,745 8/1979 Cielo et al. ....................... 346/140 R 4,339,762 7/1982 Shirato et al. .................. 346/140 R 4,376,945 3/1983 Hara et al. ....................... 346/140 R 4,450,457 5/1984 Miyachi et al. ................. 346/140 R

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A liquid jet recording head comprises a substrate having a resistive heater layer and at least one pair of mutually confronting electrodes electrically connected with the resistive heater layer at least one part of each of said one pair of electrodes being coated with the resistive heater layer.

A liquid jet recording head comprises a support, an electrothermal transducer provided on the support which is composed of at least a resistive heater layer and one pair of electrodes mutually confronting and electrically connected with the resistive heater layer, and a liquid flow path constructing member provided in correspondence with the electrothermal transducer and constituting a liquid flow path communicating with an orifice for ejecting liquid. The electrodes and the resistive heater layer are formed successively on the support to form the electrothermal transducer.

12 Claims, 10 Drawing Figures

LIQUID JET RECORDING HEAD

This application is a continuation of application Ser. No. 694,317, filed Jan. 24, 1985, now abandoned.

BACKGROUND OF THE INVENTION

1. Field of the Invention

This invention relates to a liquid jet recording head which ejects liquid to produce flying liquid droplets to record.

2. Description of the Prior Art

Ink jet recording methods (liquid jet recording methods) have recently attracted attention since noise upon recording is very little and a high speed recording is possible, and further, the recording can be made on plain paper without any special treatment such as fixation Among them, for example, a liquid jet recording method disclosed in Japanese Patent Laid-open No. 51837/1979 and German Patent Laid-open (DOLS)No. 2843064 is different from other liquid jet recording methods in point that heat energy is applied to liquid to produce a driving force for ejecting liquid droplets.

That is, the above-mentioned recording method comprises applying heat energy to a liquid to cause an abrupt increase in the volume of the liquid, ejecting the liquid from the orifice at the front of the recording head to form flying liquid drop.ets and attaching the droplets to a record receiving member to effect recording.

In particular, the liquid jet recording method disclosed in DOLS No. 2843064 cannot be only effectively suitable for so-called "drop-on demand" recording methods, but also enables to realize easily a high density multiorifice recording head of a full-line type, and therefore, images of high resolution and high quality can be produced at a high speed.

The recording head portion of an apparatus used for the above-mentioned recording method comprises a liquid ejecting portion constituted of an orifice for ejecting liquid and a liquid flow path containing, as a part of the construction, a heat actuating portion communicated with the orifice and applying heat energy for ejecting liquid droplets to the liquid, and an electrothermal transducer for generating heat energy.

The electrothermal transducer is provided with a pair of electrodes formed on a support and a resistive heater layer connected to the electrodes and having a region generating heat (heat generating portion) between the electrodes.

A typical embodiment of the structure of such liquid jet recording head is shown in FIG. 1A and FIG. 1B.

FIG. 1A is a partial front view of the liquid jet recording head viewed from the orifice side, and FIG. 1B is a partial cross-sectional view taken along the dot and dash line XY of FIG. 1A.

Recording head 100 is constituted of orifice 104 and liquid ejecting portion 105 formed by bonding the surface of substrate 102 provided with electrothermal transducer to a grooved plate 103 having a predetermined number of grooves having a predetermined width and depth at a predetermined line density such that the grooved plate covers the substrate In FIG. 1, the recording head has a plurality of orifices 104, but the present invention is not limited to such an embodiment and a recording head having a single orifice is also within the scope of the present invention.

Liquid ejecting portion 105 has orifice 104 ejecting liquid at the end and heat acturating portion 106 where heat energy generated by electrothermal transducer is applied to liquid to form a bubble and an abrupt state change due to expansion and shrinkage of the volume occurs.

Heat actuating portion 106 is located above heat generating portion 107 of electrothermal transducer and a heat actuating surface 108 where heat generating portion 107 contacts the liquid is the bottom surface of the heat actuating portion 106.

Heat generating portion 107 is constituted of resistive heater layer 110 provided on lower layer 109 formed in substrate and upper layer 111 provided on resistive heater layer 110. Electrodes 112 and 113 are provided on the surface of resistive heater layer 110 for flowing electric current to the layer 110 to generate heat. Electrode 113 is a selection electrode for selecting the heat generating portion of each liquid ejecting portion to generate heat, and electrode 112 is an electrode common to heat generating portions of liquid ejecting portions and is provided along the liquid flow path of each liquid ejecting portion.

Upper layer 111 serves to protect chemically and physically resistive heater layer 110 from the liquid at the heat generating portion 107 by isolating resistive heater layer 110 from the liquid in the liquid flow path at liquid ejecting portion 105 and further upper layer 111 prevents electrodes 112 and 113 from shortcircuiting through the liquid. Thus, upper layer 111 serves to protect resistive heater layer 110. Upper layer 111 also serves to prevent electric leakage between adjacent electrodes. In particular, it is important to prevent electric leakage between selection electrodes and electrolytic corrosion of electrodes caused by electric current flowing in an electrode resulting from contact of an electrode under the liquid flow path with the liquid which happens by some cause. Therefore, such an upper layer 111 having a protective function is provided on at least an electrode which is disposed under a liquid flow path.

The upper layer is required to have various properties depending on the position to be disposed. That is, for example, the following characteristics are required at heat generating portion 107:

(1) heat resistance,
(2) liquid resistance,
(3) liquid penetration preventing property,
(4) thermal conductivity,
(5) oxidation preventing property,
(6) insulating property, and
(7) breakage preventing property.

At portions other than heat generating portion 107, sufficiently high liquid penetration preventing property, liquid resistance and breakage preventing property are required though the resisting property to thermal conditions is not required to be so good.

However, at present there is not any material for constituting the upper layer capable of sufficiently satisfying all the characteristics (1)–(7) as mentioned above. It is the present status that some of the conditions (1)–(7) are not severely requested.

Apart from the above, in the case of a liquid jet recording head of a multi-orifice type, since a number of fine electrothermal transducers are formed on the substrate simultaneously, formation of each layer of the substrate and removal of a part of the formed layer are repeated, and as a result, the surface on which each layer in the upper layer is to be formed becomes a fine uneven surface having step edge portions, and therefore, the step coverage property of the layers in the upper layer at the step edge portions becomes important. In other words, when the step coverage property at the step edge portions is poor, penetration of the liquid occurs at the portions and causes electrolytic corrosion or dielectric breakdown. Further, when the formed upper layer suffers the formation of defects upon fabrication with a considerable probability, penetration of liquid occurs through the defect portion resulting in shortening the life of the electrothermal transducer to a great extent.

In view of the foregoing, it is required that the upper layer has a good step coverage property at the step edge, defects such as pinholes and the like occur in the formed layer with only a low probability and even if the defects are formed, the number of defects is negligibly small or less.

In order to satisfy those requisites, heretofore the upper layer has been produced by laminating the first protective layer composed of an inorganic insulating material and the second protective layer composed of an organic material, or the first protective layer is constituted of two layers, that is, an under layer composed of an inorganic insulating material and an above layer composed of an inorganic material of high toughness, relatively excellent mechanical strength and having adhesion and cohesion to the first protective layer and the second protective layer, such as metals and the like, or the third protective layer composed of an inorganic material such as metals and the like overlies the second protective layer.

However, it is very difficult that the upper layer having no defects is formed by the above-mentioned process. The liquid jet recording head satisfying all the requirements and having totally excellent durability for use has not yet been provided

SUMMARY OF THE INVENTION

An object of the present invention is to provide a liquid jet recording head free from the above-mentioned drawbacks.

Another object of the present invention is to provide a liquid jet recording head which has a general durability upon the frequent repeated use and the long time continuous use and can stably maintain the excellent liquid droplet forming characteristics as at the beginning for a long period of time.

A further object of the present invention is to provide a liquid jet recording head which can be fabricated with a high reliability.

Still another object of the present invention is to provide a liquid jet recording head which can be fabricated in a high yield even when it is of a multi-orifice type.

According to one aspect of the present invention, there is provided a liquid jet recording head comprising a substrate having a resistive heater layer and at least one pair of electrodes electrically connected with the resistive heater layer, characterized in that at least one part of each of said one pair of electrodes is coated with the resistive heater layer.

According to another aspect of the present invention, there is provided a liquid jet recording head comprising a support, an electrothermal transducer provided on the suppport which is composed of at least a resistive heater layer and one pair of electrodes mutually confronting and electrically connected with the resistive heater layer, and a liquid flow path constructing member provided in correspondence with the electrothermal transducer and constituting a liquid flow path communicated with an orifice for ejecting liquid, characterized in that the electrodes and the resistive heater layer are formed successively on the support to form the electrothermal transducer.

BRIEF DESCRIPTION OF THE DRAWINGS

FIG. 2A shows schematically a partial front view.

DESCRIPTION OF THE PREFERRED EMBODIMENTS

Figure 1A:
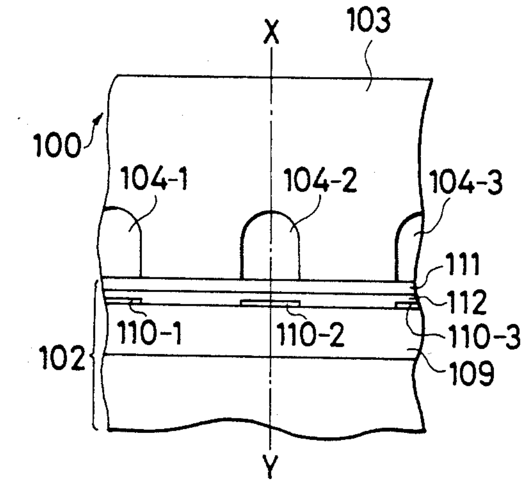
FIG. 1A and B refer to a conventional liquid jet recording head, FIG. 1A shown schematically a partial front view

A liquid jet recording head of the present invention will be described in detail referring to the drawings.

Figure 1B:
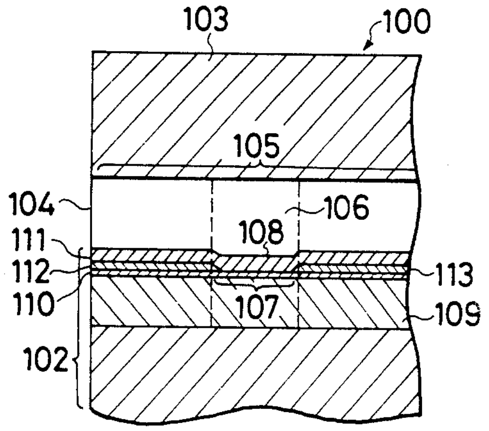
FIG. 1B is a partial cross-sectional view taken along a dot and dash line XY in FIG. 1A.
Figure 2A:
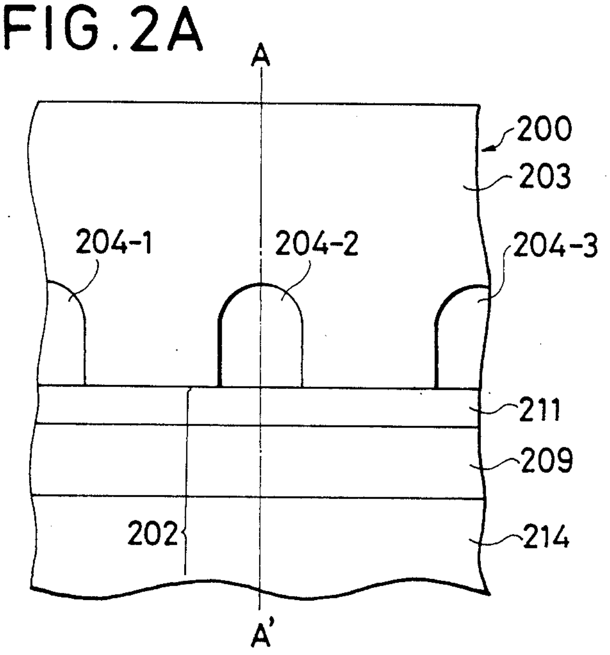
FIG. 2A and B refer to a liquid jet recording head according to the present invention.
Figure 2B:
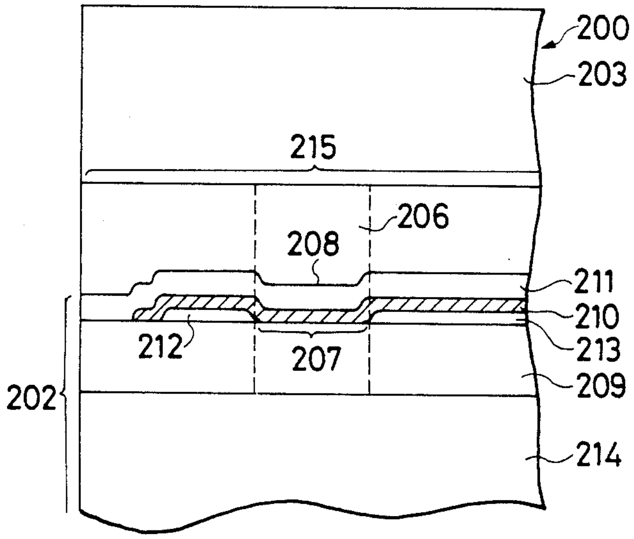
FIG. 2B is a partial cross-sectional view taken along a dot and dash line AA' in FIG. 2A.

FIG. 2A is a partial front view of a liquid jet recording head of the present invention viewed from the orifice side for explaining the main part of the structure of a preferable embodiment of the present invention and FIG. 2B shows a partial cross-sectional view taken along a dot and dash line in FIG. 2A. FIG. 2A and FIG. 2B correspond to FIG. 1A and FIG. 1B, respectively.

Liquid jet recording head 200 is mainly constituted of a substrate 202 provided with a predetermined number of electrothermal transducer for liquid jet recording where heat is used for liquid ejection and a grooved plate 203 having a predetermined number of grooves corresponding to the above-mentioned electrothermal transducers 204 - 1, 204 - 2 and 204 - 3 are liquid flow paths.

Substrate 202 and grooved plate 203 are bonded at predetermined portions with adhesives or the like to form liquid flow path 215 defined by the portion of substrate 202 where electrothermal transducer is provided and the groove of grooved plate 203, and the liquid flow path 215 has heat actuating portion 206.

Substrate 202 is constituted of support 214 composed of silicon, glass, ceramics or the like, lower layer 209 overlying support 206 and composed of $SiO_2$ or the like, common electrode 212, selection electrode 213, resistive heater layer 210 overlying each electrodes, and upper layer 211 overlying resistive heater layer 210.

The electrothermal transducer comprises heat generating portion 207 as the main portion. The heat generating portion 207 is constituted of support 214, lower layer 209, resistive heater layer 210 and upper layer 211 successively formed. The surface of upper layer 211 (heat actuating surface 208) directly contacts the liquid filled in liquid flow path 215.

Upper layer 211 is constituted of inorganic materials relatively excellent in electric insulating property, thermal conductivity, and heat resistance, for example, inorganic oxides such as $SiO_2$ and the like and inorganic nitrides such as $Si_3N_4$ and the like.

As described above, the upper layer may be formed with a combination of the first protective layer, the second protective layer, the third protective layer.

As materials constituting the first protective layer, there are preferably used inorganic insulating materials relatively excellent in thermal conductivity and heat resistance, for example, inorganic oxides such as $SiO_2$ and the like, transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide and the like, metal oxides such as aluminum oxide, calcium oxide, strontium oxide, barium oxide, silicon oxide and the like and composites thereof, high resistance nitrides such as silicon nitride, aluminum nitride, boron nitride, tantalum nitride and the like and composites of these oxides and nitrides, and thin film materials, for example, semiconductors comprising amorphous silicon, amorphous selenium and the like which have low resistance as bulk, but may be made to have high resistance by a sputtering method, a CVD method, a vapor deposition method, a gas phase reaction method, a liquid coating method or the like.

As materials used for forming the third protective layer, in addition to Ta as mentioned above, there may be mentioned the elements of Group IIIa of the periodic Table such as Sc, Y and the like, the elements of Group IVa such as Ti, Zr, Hf and the like, the elements of Group Va such as V, Nb and the like, the elements of the Group VIa such as Cr, Mo, W and the like, the elements of Group VIII such as Fe, Co, Ni and the like, alloys of the above-mentioned metals such as Ti-Ni, Ta-W, Ta-Mo-Ni, Ni-Cr, Fe-Co, Ti-W, Fe-Ti, Fe-Ni, Fe-Cr, Fe-Ni-Cr and the like, bodides of the above-mentioned metals such as Ti-B, Ta-B, Hf-B, W-B and the like, carbides of the above-mentioned metals such as Ti-C, Zr-C, V-C, Ta-C, Mo-C, Cr-C and the like, silicides of the above-mentioned metals such as Mo-Si, W-Si, Ta-Si and the like, nitrides of the above-mentioned metals such as Ti-N, Nb-N, Ta-N and the like. Using these materials, the third protective layer may be formed by the procedure such as a vapor deposition method, a sputtering method, a CVD method and the like. The third protective layer may be composed of the above materials, alone or in combination.

The second protective layer is composed of an organic insulating material which is excellent in prevention of liquid penetration and liquid resistance, and further has preferably the following characteristics:

(1) Good film shapeability,
(2) Dense structure and free from pinholes,
(3) Not swelled with and not dissolved in the ink,
(4) High insulating property when film-shaped,
(5) High heat resistance, and the like.

As the organic materials, there may also be used, for example, silicone resin, fluorine resin, aromatic polyamide, addition polymerization type polyimide, polybenzimidazole, metal chelate polymer, titanic acid ester, epoxy resin, phthalic resin, thermosetting phenolic resin, p-vinylphenolic resin, Zirox resin, triazine resin, BT resin (addition polymerized resin of triazine resin and bismaleimide) or the like. Alternatively, it is also possible to form the second protective layer by vapor deposition of polyxylylene resin and derivatives thereof.

Further, the second protective layer may also be formed by film shaping according to a plasma polymerization using various organic monomers such as thiourea, thioacetamide, vinyl ferrocene, 1,3,5-trichlorobenzene, chlorobenzene, styrene, ferrocene, pyroline, naphthalene, pentamethylbenzene, nitrotoluene, acrylonitrile, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzeneselenol, tetrafluoroethylene, ethylene, N-nitrosodiphenylamine, acetylene, 1,2,4-trichlorobenzene, propane and the like.

However, when a recording head of a high density multi-orifice type is manufactured, apart from the above-mentioned organic materials, it is desirable to use organic materials capable of being very easily processed by a fine photolithography as materials for forming the second protective layer.

As examples of the organic materials, there may be preferably used, for example, polyimidoisoindoloquinazolinedione (trade name; PIQ, produced by Hitachi Kasei Co., Japan), polyimide resin (trade name: PYRALIN, produced by Du Pont, U.S.A.), cyclized polybutadiene (trade name: JSRCBR, CBR-M901, Japan Synthetic Rubber Co., Japan), Phtotonith (trade name: produced by Toray Co., Japan), other photosensitive polyimide and the like.

As the material constituting resistive heater layer 210, there may be used most materials capable of generating heat as desired by flowing electric current.

However, it is desirable that the materials are neither chemically changed by nor dissolved in the ink used and have high heat resistance.

As examples of the materials, there may be preferably used, for example, tantalum nitride, nichrome, silver-palladium alloy, silicon semiconductor, or a metal such as hafnium, lanthanum, zirconium, titanium, tantalum, tungsten, molybdenum, niobium, chromium, vanadium and the like, alloys thereof, borides thereof or the like.

Even if the ink in the liquid flow path contacts the substrate through cracks and pinholes formed in upper layer 211, these materials are passivated at the portion contacting the ink and a passive layer is formed. Therefore, the ink does not reach the electrode layer and electrolytic corrosion does not occur. Thereby durability for the liquid jet recording head is improved.

Using the above-mentioned material, the resistive heater layer 210 may be formed by the procedure such as an electron beam method, a sputtering method and the like.

As the materials for constituting electrodes 212 and 213, there may be effectively used most of conventional electrode materials, and there are mentioned, for example, Al, Ag. Au, Pt, Cu and the like. The electrodes may be formed at a predetermined position with a predetermined size, shape and thickness by means of vapor deposition or the like.

Lower layer 209 is provided so as to control mainly the transfer of heat generated at heat generating portion 207 to support 214. The construction material is selected and the layer thickness is designed in such a way that the heat generated at heat generating portion 207 flows more to the heat actuating portion 206 side than to other portions when heat energy is applied to the liquid at heat actuating portion 206 while the heat remaining at heat generating portion 207 flows rapidly to the support 214 side when the electric current to electrothermal transducer is switched off.

As the material for constituting lower layer 209, there may be used inorganic materials represented by metal oxides such as $SiO_2$, zirconium oxide, tantalum oxide, magnesium oxide and the like.

Support 214 is composed of silicon, glass, ceramics or the like.

As the materials for constituting the grooved plate 203 and the common liquid chamber provided at the upstream portion of heat actuating portion 206, there may be used most of the materials satisfying the following conditions: (i) the shape is hardly or not thermally affected during fabricating the recording head or under the circumstance of using the recording head; (ii) a fine precise processing can be applied thereto and the surface accuracy can be easily obtained as desired; and (iii) the resulting liquid paths can be processed to permit the liquid to flow smoothly in the paths.

Representative materials for the above-mentioned purpose are preferably ceramics, glass, metals, plastics, silicon wafer and the like, and in particular, glass and silicon wafer are more preferable since they are easily processed, and have an appropriate degree of heat resistance, coefficient of thermal expansion and thermal conductivity. It is desired to apply to the outer surface of the circumference of orifice 204 a water repellent treatment where the liquid is aqueous and an oil repellent treatment where the liquid is non-aqueous, so as to prevent the liquid from leaking and flowing to the outside portion of orifice 204.

The said orifice may be formed by adhering a photosensitive resin plate such as a dry film and the like to substrate, forming a pattern by photolithography and then adhering the ceiling plate.

Figure 3A:
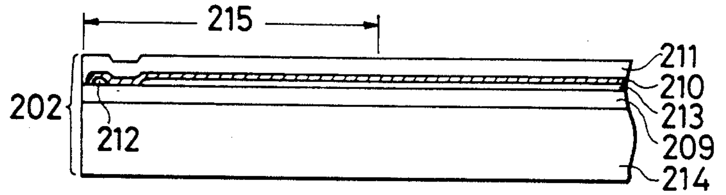
FIGS. 3A, B and C are partial cross-sectional views taken along a dot and dash line AA' in FIG. 2A to show embodiments of the present invention.
Figure 3B:
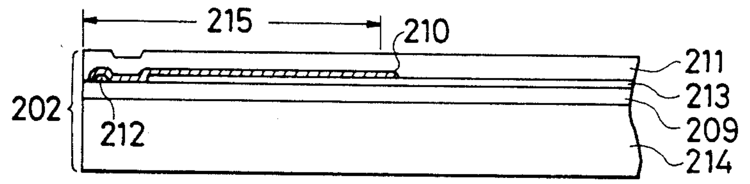
Figure 3C:
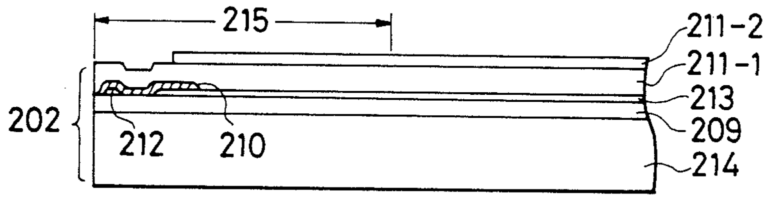

As described above, resistive heater layer 210 may be formed on the whole surface of electrodes 212 and 213 as shown in FIG. 3A, or only on the surface of electrodes 212 and 213 under the liquid flow path 215 as shown in FIG. 3B. Alternatively, in case that dissolution of electrodes can be almost prevented by selecting appropriately the material of the upper layer 211 or an appropriate structure of the upper layer 211 composed of first protective layer 211-1 and second protective layer or third protective layer 211-2, as shown in FIG. 3C, a sufficient effect can be obtained by providing resistive heater layer 210 only on a limited portion.

Figure 4A:
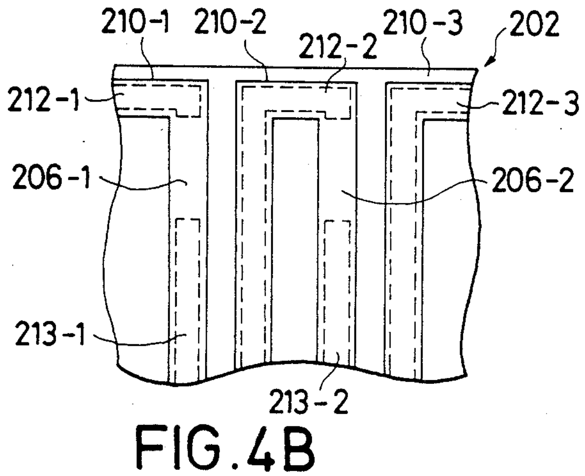
FIGS. 4A, B, and C are front views of embodiments of the present invention.
Figure 4B:
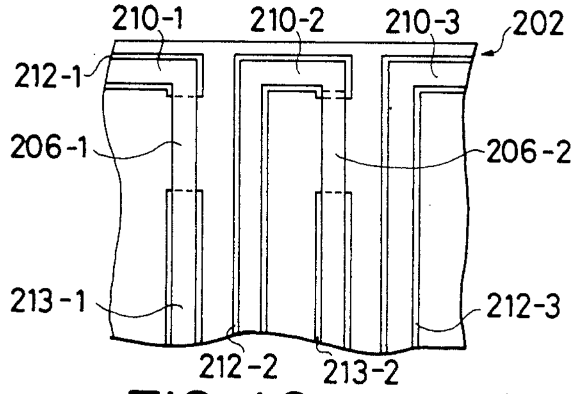
Figure 4C:
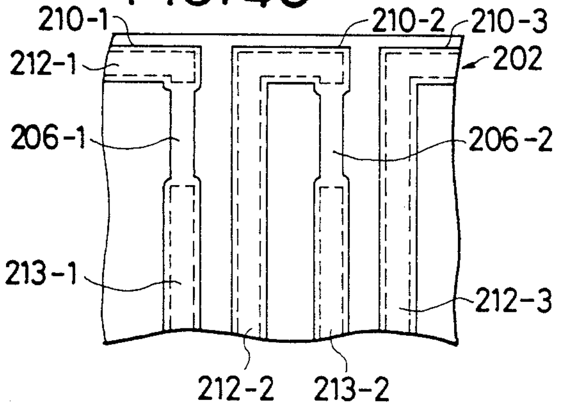

Further, the width of resistive heater layer 210 is most preferably wider than widths of electrodes 212 and 213 as shown in FIG. 4A. However, as shown in FIG. 4B, it is necessary only that the surface of the electrodes is almost coated with resistive heater layer 210. Alternatively, the width of resistive heater layer 210 at the heat actuating portion may be narrower than that of the resistive heater layer coating the electrode as shown in FIG. 4C.

The liquid jet recording head of the present invention is illustrated by referring to the following Example.

EXAMPLE

Liquid jet recording heads of the present invention as shown in FIG. 2, FIG. 3A and FIG. 4A were manufactured as shown below.

An $SiO_2$ film of 5 $\mu m$ thick was formed by thermally oxidizing an Si wafer. On the $SiO_2$ film, Ti layer of 50 Å thick and Al layer of 5,000 Å thick were deposited successively by an electron beam deposition. By photolithographic steps, the electrode was patterned to form electrodes 212 and 213.

As the next step, a resistive heater layer composed of $HfB_2$ of 1500 Å thick was formed by sputtering and then, by photolithographic steps, a portion corresponding to the resistive heater layer was patterned with a resist, followed by etching a portion corresponding to heat actuating portion 207 to form resistive heater layer 210. Size of the heat actuating surface was 30 $\mu m$ in width and 150 $\mu m$ in length.

Then, upper layer 111 composed of $SiO_2$ of 2.8 $\mu m$ thick was deposited by a high rate sputtering.

Grooved plate 203 composed of glass was adhered on the predetermined place of the substrate fabricated as described above. Size of liquid flow path 215 was 50 $\mu m$ in width and 50 $\mu m$ in height. The resulting liquid jet recording head ($B_1$) and a conventional liquid jet recording head (A) were investigated for the rate of a breakdown (the number of open wire/all segments) by applying a pulse-shaped signal having 40 V, 10 $\mu s$ in pulse width and 5 kHz in repetition frequency to an ink (pH4–9) maintained at 60° C. The results are as shown in Table 1. The liquid jet recording head of the present invention has excellent durability and can keep, over a long time, the good initial property for forming droplets.

The heads $B_2$ and $B_3$ were similarly fabricated using resistive heater layer 210 comprising $TaN_2$ or Ta and were investigated for the rate of breakdown. As shown in Table 1, the results indicate that the heads $B_2$ and $B_3$ have excellent durability and can keep the good initial property for forming droplets over a long time.

TABLE 1

| Type of head | Constructive material: Electrode | Constructive material: Resistive heating element | Rate of breakdown: $10^5$ | $10^6$ | $10^7$ | $10^8$ |
|---|---|---|---|---|---|---|
| A | Al | $HfB_2$ | 5% | 12% | 32% | 89% |
| B | | | | | | |
| 1 | Al | $HfB_2$ | 0% | 1% | 5% | 21% |
| 2 | Al | $TaN_2$ | 0% | 0% | 2% | 17% |
| 3 | Al | Ta | 0% | 0% | 1% | 17% |

The said resistive heater layer may be coated on the whole surface of the electrode, only on a portion corresponding to the liquid flow path or only on the heat actuating portion and its vicinity. The coating portion may be determined in accordance with a combination with the upper layer.

Width of the resistive heater layer overlying the electrode is not critical as far as it can almost cover the electrode. The width on the heat actuating surface where an electrode is not provided may be narrower than that at a portion overlying the electrode. By constructing as described above, a rise of temperature at the boundary between the electrode and the resistive heater layer is suppressed and a recording head having a higher reliability can be provided.

What is claimed is:

1. A liquid jet recording head comprising:
   - a supporting member;
   - an electrode layer laminated on said supporting member to form mutually confronting electrodes;
   - a resistive heater layer laminated on said electrodes and said supporting member in electrical contact with said electrodes to provide a heat generating portion disposed on said supporting member between said mutually confronting electrodes and arranged to correspond to a liquid flow path of the recording head; and an upper layer laminated on said resistive heater layer, wherein said resistive heater layer and said upper layer form successive protective layers between said electrodes and liquid in said liquid flow path.

2. A liquid jet recording head according to claim 1, wherein the width of at least of the portion of said resistive heater layer laminated on said electrodes is greater than the width of said electrodes, so that said resistive heater layer completely encloses said electrodes in cooperation with said supporting member.

3. A liquid jet recording head according to claim 2, wherein the width of the portion of said resistive heater layer laminated on said supporting member between said electrodes is less than the width of the portion of said resistive heater layer laminated on said electrodes.

4. A liquid jet recording head according to claim 2, further comprising a flow path defining means attached to said supporting member to provide the liquid flow path.

5. A liquid jet recording head according to claim 1 wherein the upper layer is composed of inorganic insulating materials.

6. A liquid jet recording head according to claim 1 wherein the upper layer comprises inorganic insulating materials and organic materials.

7. A liquid jet recording head comprising:

a supporting member;

an electrothermal transducer, including a pair of mutually confronting electrodes laminated on a first portion of said supporting member to define a second portion of said supporting member between said electrodes, and a resistive heater layer, laminated on said electrodes and said second portion of said supporting member in electrical contact with said electrodes, to provide a heat generating portion disposed on said second portion of said supporting member and arranged to correspond to a liquid flow path of the recording head; and an upper layer laminated on said resistive heater layer, wherein said resistive heater layer and said upper layer form successive protective layers between said electrodes and liquid contained in the liquid flow path.

8. A liquid jet recording head according to claim 7 wherein the width of at least of the portion of said resistive heater layer laminated on said electrodes is greater than the width of said electrodes, so that said resistive heater layer completely encloses said electrodes in cooperation with said supporting member.

9. A liquid jet recording head according to claim 8, wherein the width of the portion of said resistive heater layer laminated on said supporting member between said electrodes is less than the width of the portion of said resistive heater layer laminated on said electrodes.

10. A liquid jet recording head according to claim 7, further comprising a liquid flow path constructing member attached to said supporting member to provide the liquid flow path.

11. A liquid jet recording head according to claim 7 wherein the upper layer is comprises inorganic insulating materials.

12. A liquid jet recording head according to claim 7 wherein the upper layer comprises a layer comprising inorganic insulating materials and organic materials provided on at least a part of the upper portion of the electrodes and a layer comprising inorganic insulating materials and inorganic materials provided on at least a part of the resistive heater layer between the electrodes.

* * * * *

UNITED STATES PATENT AND TRADEMARK OFFICE
CERTIFICATE OF CORRECTION

PATENT NO. : 4,720,716 Page 1 of 3

DATED : January 19, 1988

INVENTOR(S) : MASAMI IKEDA, ET AL.

It is certified that error appears in the above-identified patent and that said Letters Patent is hereby corrected as shown below:

AT [57] IN THE ABSTRACT

Line 4, "layer" should read --layer,--.

COLUMN 1

Line 23, "point" should be deleted.
Line 29, "drop.ets" should read --droplets--.
Line 33, "drop-on demand" should read --drop-on-demand--.
Line 64, "substrate In" shoul read --substrate. In--.

COLUMN 2

Line 2, "acturating" should read --actuating--.
Line 14, "substrate" should read --the substrate--.
Line 56, "required" should read --required,--.

COLUMN 3

Line 15, "has" should read --have--.
Line 17, "probability" should read --probability,--.
Line 17, "the" should read --such--.
Line 26, "above" should read --upper--.
Line 31, "the third" should read --a third--.
Line 36, "The" should read --A--.
Line 46, "the" (both occurrences) should be deleted.
Line 55, "in a" should read --with--.
Line 67, "suppport" should read --support--.

UNITED STATES PATENT AND TRADEMARK OFFICE

CERTIFICATE OF CORRECTION

PATENT NO. : 4,720,716
DATED : January 19, 1988
INVENTOR(S) : MASAMI IKEDA, ET AL.

It is certified that error appears in the above-identified patent and that said Letters Patent is hereby corrected as shown below:

COLUMN 4

Line 12, "shown" should read --shows--.
Line 39, "transducer" should read --transducers--.
Line 55, "electrodes," should read --electrode,--.

COLUMN 5

Line 20, "resistance as bulk," should read --bulk resistance--.
Line 27, "periodic" should read --Periodic--.
Line 35, "bodides" should read --borides--.

COLUMN 6

Line 25, "Phtotonith" should read --Photonith--.
Line 31, "are" should read --be--.
Line 52, "of" should be deleted.
Line 54, "Ag. Au," should read --Ag, Au,--.

COLUMN 8

Line 7, "Size" should read --The size--.
Line 9, "upper layer 111" should read --upper layer 211--.
Line 13, "Size" should read --The size--.
Line 49, "Width" should read --The width--.
Line 53, "con-" should be deleted.
Line 54, "structing as" should read --using the construction--.

UNITED STATES PATENT AND TRADEMARK OFFICE

CERTIFICATE OF CORRECTION

PATENT NO. : 4,720,716

DATED : January 19, 1988

INVENTOR(S) : MASAMI IKEDA, ET AL.

It is certified that error appears in the above-identified patent and that said Letters Patent is hereby corrected as shown below:

COLUMN 9

Line 9, "of" (second occurrence) should be deleted.

COLUMN 10

Line 12, "of" (second occurrence) should be deleted.
Line 27, "is" should be deleted.

Signed and Sealed this

Twenty-fourth Day of January, 1989

*Attest:*

DONALD J. QUIGG

*Attesting Officer*

*Commissioner of Patents and Trademarks*